(12) United States Patent
Yamane et al.

(10) Patent No.: US 8,307,746 B2
(45) Date of Patent: Nov. 13, 2012

(54) MACHINE TOOL

(75) Inventors: Masahiro Yamane, Yamatokoriyama (JP); Yohei Shinkai, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 1156 days.

(21) Appl. No.: 12/081,313

(22) Filed: Apr. 14, 2008

(65) Prior Publication Data

US 2008/0258410 A1 Oct. 23, 2008

(30) Foreign Application Priority Data

Apr. 19, 2007 (JP) ................................. 2007-111014

(51) Int. Cl.
*B23Q 11/08* (2006.01)

(52) U.S. Cl. .................. 82/132; 82/141; 82/149; 82/901

(58) Field of Classification Search .................... 82/117, 82/132, 141, 142, 149, 152, 901; 29/DIG. 94; 409/134, 137
See application file for complete search history.

(56) References Cited

U.S. PATENT DOCUMENTS

| 1,679,912 | A | * | 8/1928 | Mondloch | ........................ 384/15 |
| 4,085,625 | A | * | 4/1978 | Jung | ............................. 74/89.22 |
| 4,195,538 | A | * | 4/1980 | Brown | ............................. 82/141 |
| 4,514,936 | A | * | 5/1985 | Hurtado | ........................... 451/28 |
| 5,871,283 | A | | 2/1999 | Isobe et al. | |
| 6,082,939 | A | * | 7/2000 | Nakashima et al. | .......... 409/134 |
| 6,254,076 | B1 | | 7/2001 | Goldin | |
| 6,880,214 | B2 | | 4/2005 | Studemann et al. | |
| 7,412,759 | B1 | * | 8/2008 | Hsieh et al. | .................... 29/27 C |

FOREIGN PATENT DOCUMENTS

| DE | 8201641 U | 5/1982 |
| DE | 3622774 C | 1/1988 |
| DE | 19903188 A | 8/1999 |
| EP | 0367517 A | 5/1990 |
| EP | 1728588 A | 12/2006 |
| GB | 316469 A | 8/1929 |
| JP | 5-60751 A | 3/1993 |
| WO | 02/30615 A | 4/2002 |

* cited by examiner

*Primary Examiner* — Boyer D Ashley
*Assistant Examiner* — Sara Addisu
(74) *Attorney, Agent, or Firm* — Smith Patent Office

(57) ABSTRACT

To provide a machine tool capable of preventing even chips in a powder form and coolant from leaking to a feed mechanism side. A slide plate 12 is provided to cover a feed mechanism 16. The slide plate 12 is fixed to a second headstock 6 to move in an axial direction together with the second headstock 6. Between the slide plate 12 and a bed side member, a seal portion 31 is provided. The seal portion 31 has a first slide contact member 20 provided on the slide plate 12 and a second slide contact member 18*b* which is provided on the bed side member and in slide contact with the first slide contact member 20, and the first and second slide contact members 20 and 18*b* relatively slide while being in contact with each other.

6 Claims, 9 Drawing Sheets

MACHINE TOOL

BACKGROUND OF THE INVENTION

1. Field of the Invention

The present invention relates to a machine tool including a bed, a headstock fixed on the bed, and a movable unit (a second headstock or the like) disposed to be coaxially with the headstock and movable in an axial direction. More specifically, the present invention relates to an improvement in sealing structure of a cover member to prevent chips and so on from entering a feed mechanism side.

2. Description of the Related Art

As a sealing structure by a cover member of a conventional machine tool, for example, there is one disclosed in Japanese Utility Model Publication No. Hei 5-60751. In this conventional seal structure, telescopic cover (a cover member) is attached to the headstock. An upper hem and a lower hem of the telescopic cover are guided by guide plates. Into a gap between two guide plates on the lower hem side, an end portion of a saddle cover is inserted, and a flow path supplying compressed air to the gap is formed. A gutter and a press plate form a labyrinth below the end portion of the saddle cover. A groove and a drain hole are formed below the labyrinth.

SUMMARY OF THE INVENTION

The conventional seal structure is configured such that a front end portion of an upper portion of the saddle cover is inserted into the gap between the upper and lower guide plates guiding the lower hem of the telescopic cover, and compressed air is supplied into the gap. In other words, it is assumed that the conventional structure has the gap between the upper and lower guide plates, so that chips in a powder form and coolant can leak to a feed mechanism side even if the compressed air is supplied. In the above Patent Document 1, the labyrinth is constituted of the gutter and the press plate below a portion where the gap is formed, and the groove and the drain hole are formed below the labyrinth.

An object of the present invention is to provide a machine tool capable of preventing even chips in a powder form and coolant from leaking to a feed mechanism side.

The present invention is a machine tool including a bed, a headstock fixed on the bed, a spindle rotatably supported on the headstock, a movable unit mounted on the bed to be movable in a direction parallel to a rotation axis of the spindle, and a feed mechanism mounted on the bed for moving the movable unit in the parallel direction, wherein a cover member is provided to cover the feed mechanism. The cover member is fixed to the movable unit to move in the parallel direction together with the movable unit. A seal portion is provided between a side hem portion parallel to the moving direction of the cover member and a bed side member. The seal portion has a first slide contact member and a second slide contact member. The first slide contact member is provided on any one of the cover member side and the bed side member. The second slide contact member is provided on another of the cover member side and the bed side member. The second slide contact member is in slide contact with the first slide contact member. The first and second slide contact members relatively slide while being in contact with each other.

The present invention herein includes both of a case in which the headstock and the movable unit are disposed such that the respective rotation axes are aligned with each other and a case in which they are disposed such that both rotation axes are disposed to be parallel to each other and displaced from each other.

Further, the present invention includes both of a case in which a seal portion is provided on a side hem portion of any one of side hem portions on both sides parallel to the moving direction of the cover member, and a case in which seal portions are provided on both the side hem portions.

In the present invention, the seal portion is provided between the side hem portion and the bed side member. The seal portion is configured having the first slide contact member provided on any one of the cover member side and the bed side member and the second slide contact member provided on the other, the second slide contact member being in slide contact with the first slide contact member. The first and second slide contact members relatively slide while being in contact with each other. Therefore, it is possible to prevent creation of a gap between the first and second slide contact members to prevent even chips in a powder form and coolant from entering the feed mechanism side, thereby improving the sealing property.

In a preferred embodiment of the present invention, a first seal portion and a second seal portion are provided on a first side hem portion and a second side hem portion which are parallel to the moving direction of the cover member, respectively. The cover member is disposed in an inclined state such that the first side hem portion is located at a position higher than that of the second side hem portion, and a direction of slide contact between the first and second slide contact members in the first seal portion intersects with a direction of slide contact between the first and second slide contact members in the second seal portion.

In this embodiment, the cover member is disposed in the inclined state and configured such that the direction of slide contact between the first and second slide contact members in the first seal portion provided on the higher side intersects with the direction of slide contact between the first and second slide contact members in the second seal portion provided on the lower side, whereby the sealing property can be further improved. More specifically, in the case where the slide contact directions in the two seal portions are the same, when the sealing property on one of them in increased, the sealing property of the other can be reduced. In the present embodiment, since the slide contact directions in the two seal portions are set to intersect with each other, an increase in the sealing property of one seal portion exerts little or no adverse effect on the sealing property of the other seal portion.

In another preferred embodiment of the present invention, a direction of slide contact in the first seal portion is parallel to a direction of slide contact in the second seal portion.

In this embodiment, the slide contact direction in the first seal portion and the slide contact direction in the second seal portion are set to parallel to each other, so that both the seal portions can have similar structures to avoid complexity of structure.

In still another preferred embodiment of the present invention, a first seal portion and a second seal portion are provided on a first side hem portion and a second side hem portion which are parallel to the moving direction of the cover member, respectively, the cover member is disposed in an inclined state such that the first side hem portion is located at a position higher than that of the second side hem portion, and a slide contact area between the first and second slide contact members in the first seal portion is larger than a slide contact area between the first and second slide contact members in the second seal portion.

According to this embodiment, the slide contact area between the first and second slide contact members in the first seal portion provided on the higher side is larger than the slide contact area between the first and second slide contact members in the second seal portion provided on the lower side, whereby the sealing property can be further improved. More specifically, when the cover member is disposed in an inclined state, many chips will flow to the lower side. In this embodiment, the slide contact area in the seal portion on the lower side is large to ensure that sealing can be performed even when many chips flow thereto.

In still another preferred embodiment of the present invention, an opening is formed between a leg portion of the headstock and the bed for allowing a portion of the cover member on the headstock side to enter a space between the headstock and the bed with the movable unit approaching the headstock.

According to this embodiment, the opening is provided for allowing the portion of the cover member on the headstock side to enter the space between the headstock and the bed with the movable unit approaching the headstock, thus making it possible to prevent chips and so on entering the feed mechanism side via the headstock side.

In yet another embodiment of the present invention, a weir portion inhibiting entry of a chip to the feed mechanism side is formed downward from the slide contact member along an entrance path of the chip to the feed mechanism side.

According to this embodiment, the weir portion inhibiting entry of a chip to the feed mechanism side is formed downward from the slide contact member along the entrance path of the chip to the feed mechanism side, so that even if the chip and so on pass through a gap between the first and second slide contact members, the chip and so on can be prevented from entering the feed mechanism side from the weir portion, thereby further improving the sealing property.

DETAILED DESCRIPTION OF THE PREFERRED EMBODIMENT(S)

Figure 1:
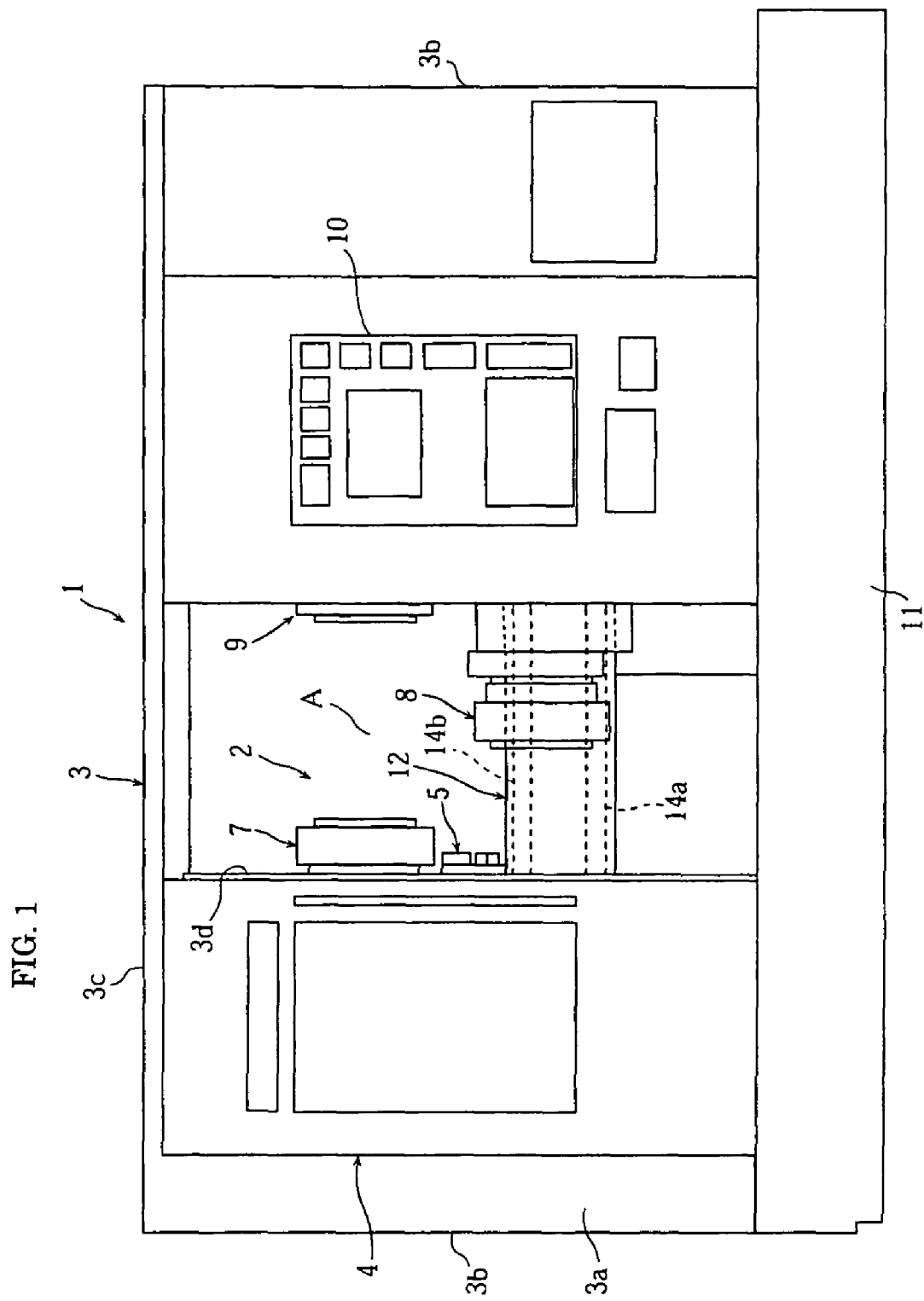
FIG. 1 is a front view of a turret lathe according to one embodiment of the present invention.
Figure 2:
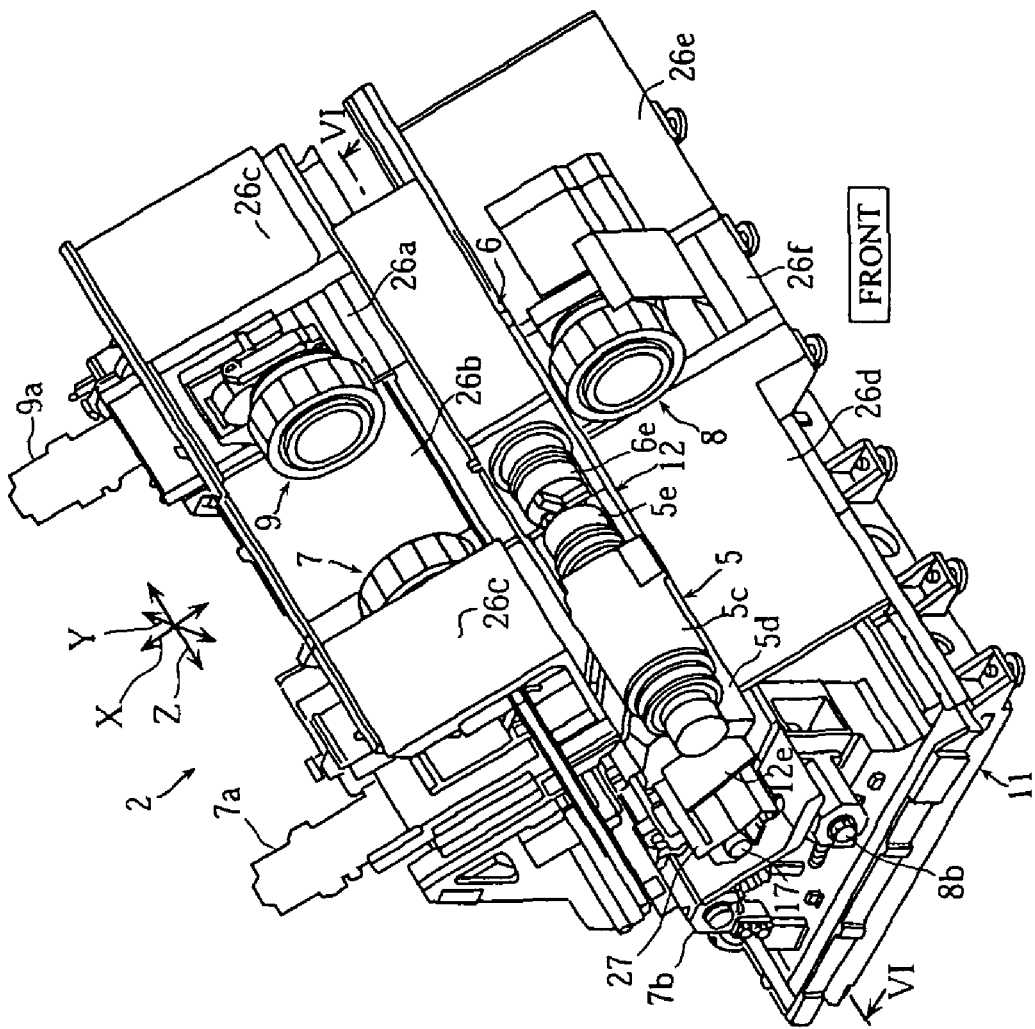
FIG. 2 is a perspective view of the lathe as viewed from the front left side.
Figure 3:
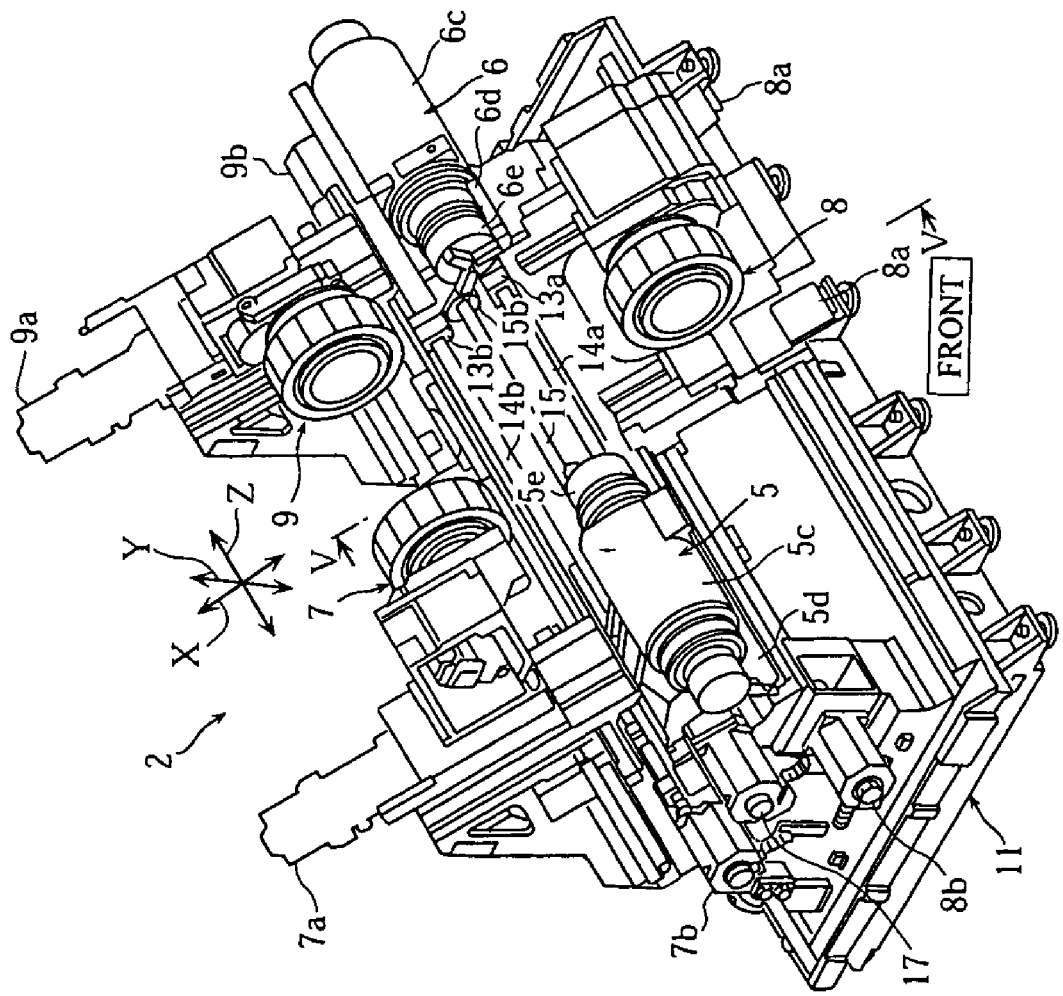
FIG. 3 is a perspective view of the lathe as viewed from the front right side.
Figure 4:
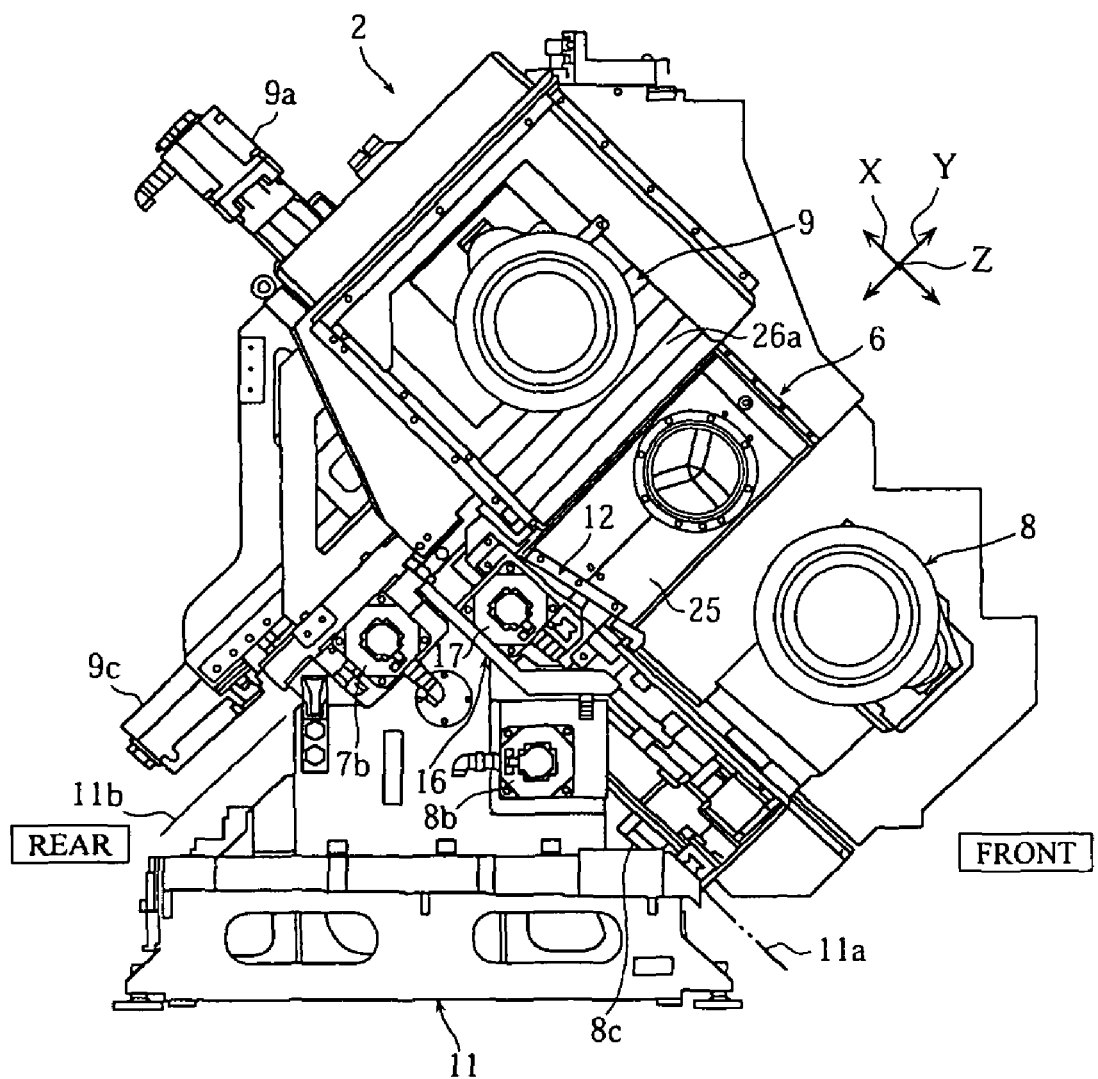
FIG. 4 is a left side view of the lathe.
Figure 5:
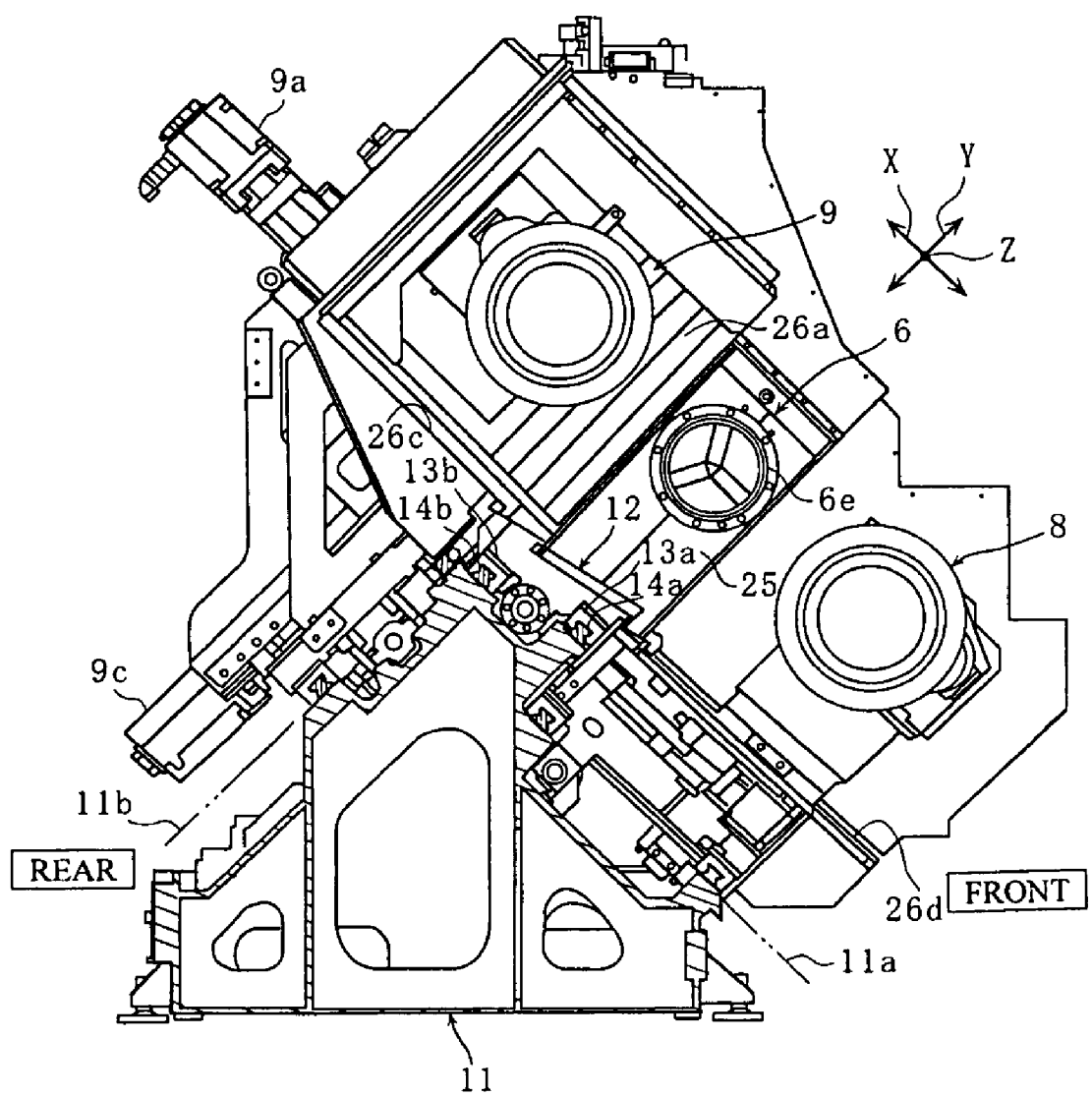
FIG. 5 is a sectional side view (a sectional view taken along a V-V line in FIG. 3) of the lathe.

Hereinafter, embodiments of the present invention will be described with reference to the accompanying drawings.

FIG. 1 to FIG. 9 are views explaining a turret lathe (machine tool) according to an embodiment of the present invention. Note that in this embodiment, front, back, left, and right mean the near side, the distant side, the left side, and the right side, respectively, as seen from the front side of the machine tool.

In these drawings, a numeral 1 denotes a turret lathe. The turret lathe 1 includes a machine body 2 for machining a workpiece, and a machine body cover 3 surrounding the periphery of the machine body 2.

The machine body cover 3 has a front cover portion 3a, left and right cover portions 3b and 3b, a ceiling cover portion 3c, and a rear cover portion (not shown) which cover the front surface, left and right side surfaces, ceiling surface and rear surface of the machine body 2, respectively. An opening portion 3d corresponding to a machining region A is formed almost at the middle of the front cover portion 3a, so that the opening portion 3d can be opened/closed by a front door 4 which is disposed to be slidable right and left.

When the front door 4 is moved to a left open position as shown in FIG. 1, the opening portion 3d is opened. Through this opening portion 3d, attachment/detachment of the workpiece to/from a later-described first headstock 5 and second headstock 6, attachment/detachment of a tool to/from first to third tool posts 7 to 9, and other maintenances can be easily performed. Note that during machining, the opening portion 3d is covered by the front door 4. On the right side of the opening portion 3d, a control panel 10 is disposed for setting of a machining program, monitoring of the machining state, and so on.

The machine body 2 included a slant-type bed 11. The bed 11 has a first slant surface 11a slanting to be lower on the near side as viewed from the front of the machine and a second slant surface 11b disposed on the distant side of the machine to be perpendicular to the first slant surface 11a. Note that the first and second slant surfaces 11a and 11b are virtual planes perpendicular to each other on the whole, and composed of a plurality of surfaces different in height.

The machine body 2 includes the first headstock 5 disposed on a left portion of the first slant surface 11a; the second headstock (movable unit) 6 disposed on a right portion of the first slant surface 11a in a manner to be coaxial with the first headstock 5 and movable in a Z-axis direction; the second tool post 8 disposed at a lower portion which is located on the near side of the bed 11, to be movable in directions of an X-axis, a Y-axis, and the Z-axis; and the first and third tool posts 7 and 9 disposed at higher portions which are located on the distant side of the bed 11, to be movable in the directions of the X-axis, the Y-axis and the Z-axis.

The X-axis here is a direction perpendicular to the axes of the first and second headstocks 5 and 6 and parallel to the first slant surface 11a, which means a forward-backward direction as viewed from the front of the machine. The Z-axis is a direction parallel to the aforementioned axes, which means a right-left direction as viewed from the front of the machine. Further, the Y-axis is a direction perpendicular to a plane including the X-axis and the Z-axis, which means a direction normal to the first slant surface 11a.

The second tool post 8 is disposed on the first slant surface 11a to be parallel to the first slant surface 11a and movable in a direction normal to the surface, so that it is driven in the X-axis direction by drive motors 8a and 8a, driven in the Z-axis direction by a drive motor 8b, and driven in the Y-axis by the drive motor 8c.

The first and third tool posts 7 and 9 are disposed on the second slant surface 11b to be parallel to the second slant surface 11b and movable in a direction normal to the surface, so that it is driven in the X-axis direction by drive motors 7a and 9a, and driven in the Z-axis direction by drive motors 7b and 9b. The first turret 7 is driven by a not-shown drive motor, and the third turret 9 is driven by a drive motor 9c, in the Y-axis direction.

Figure 6:
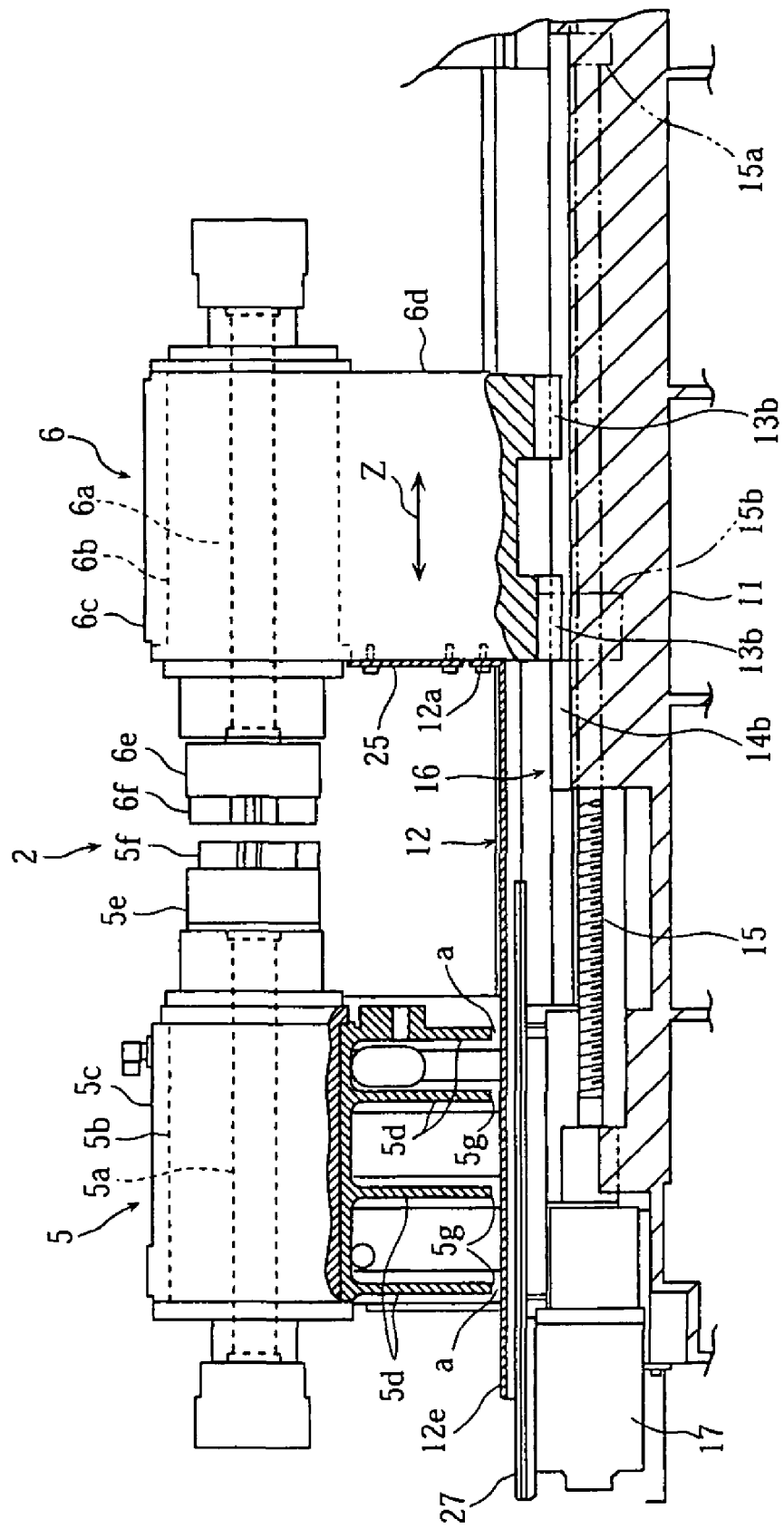
FIG. 6 is a sectional front view (a sectional view taken along a VI-VI line in FIG. 2) of the lathe.
Figure 7:
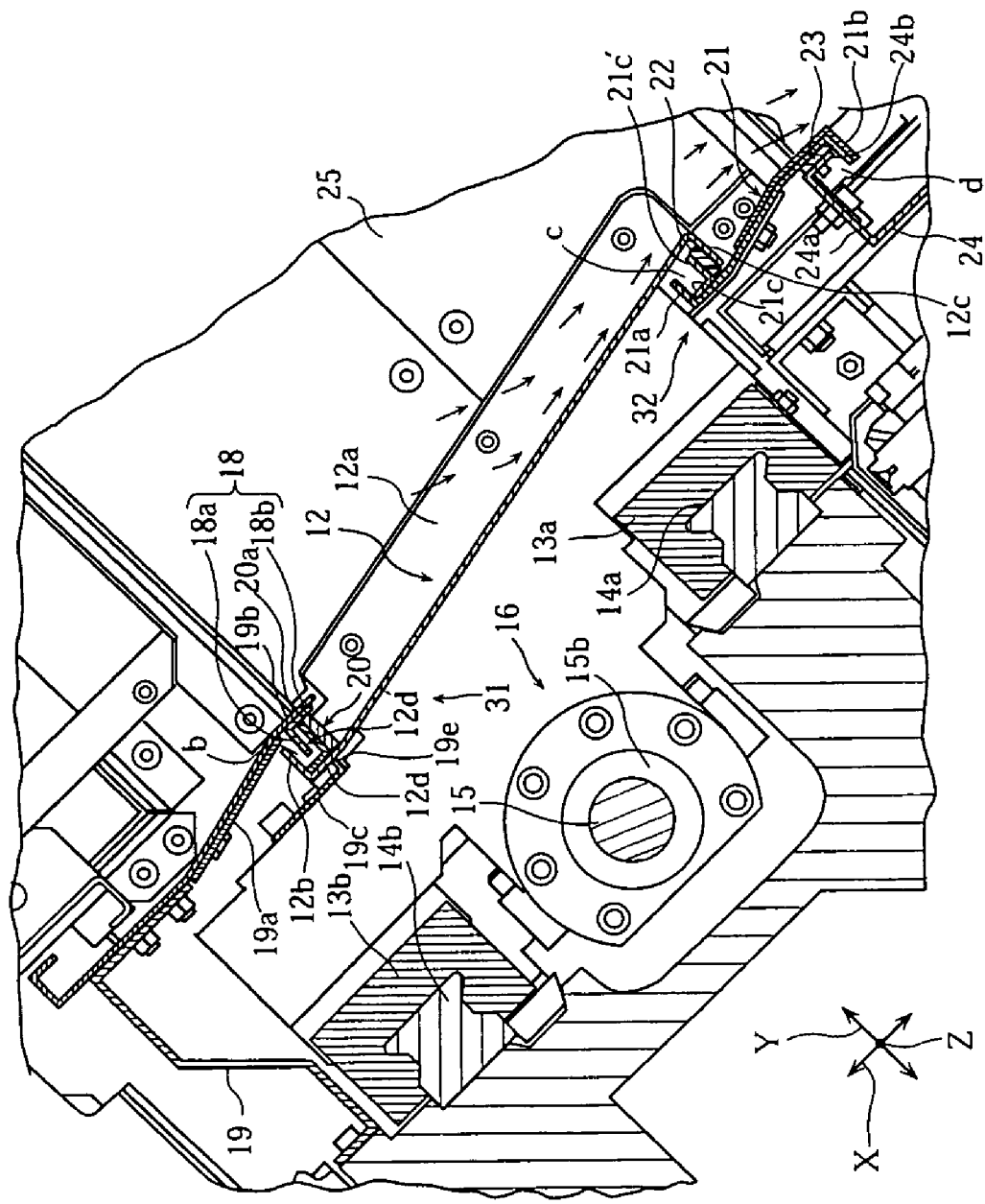
FIG. 7 is a sectional left side view of a slide plate portion of the lathe.
Figure 8:
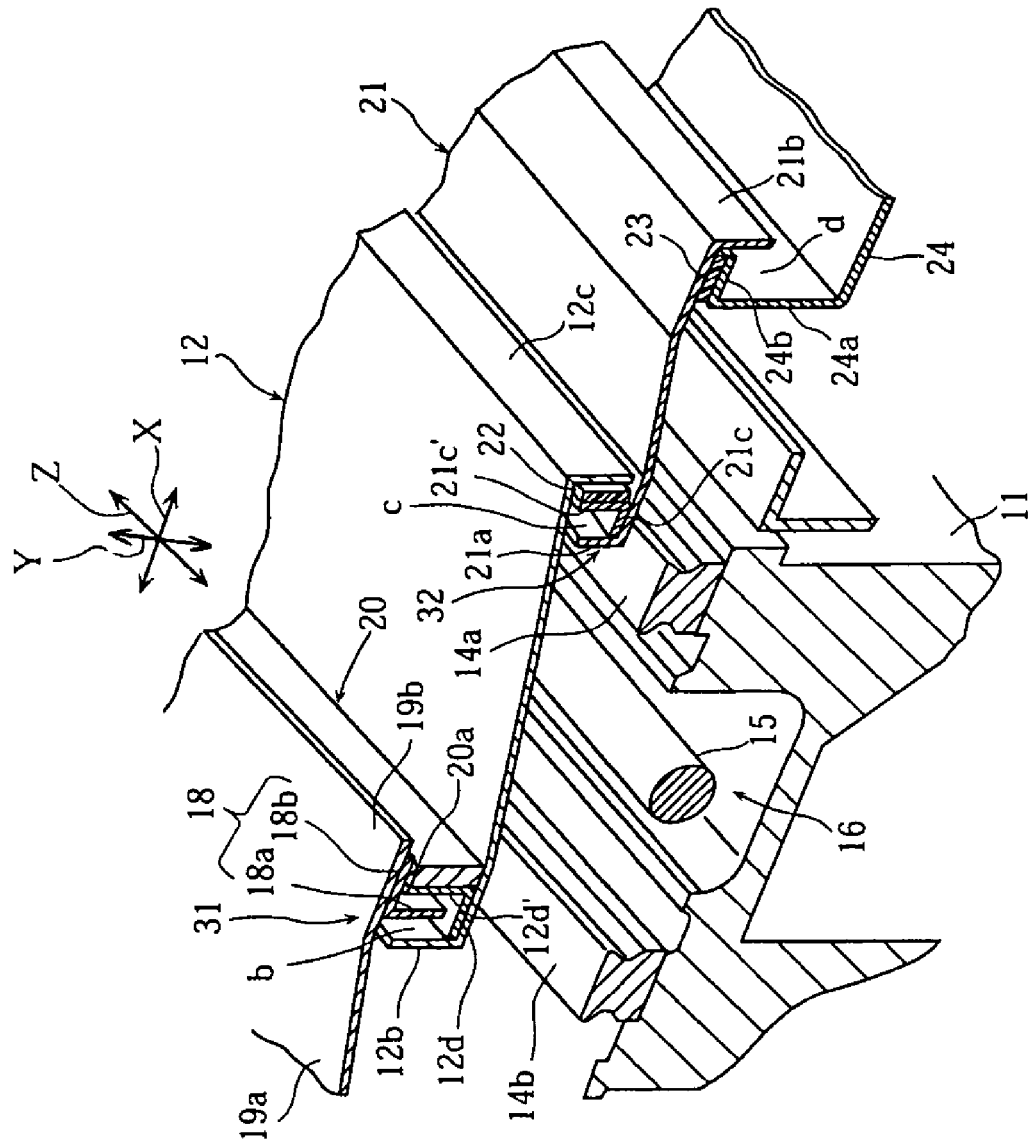
FIG. 8 is a perspective view of the slide plate portion of the lathe.
Figure 9:
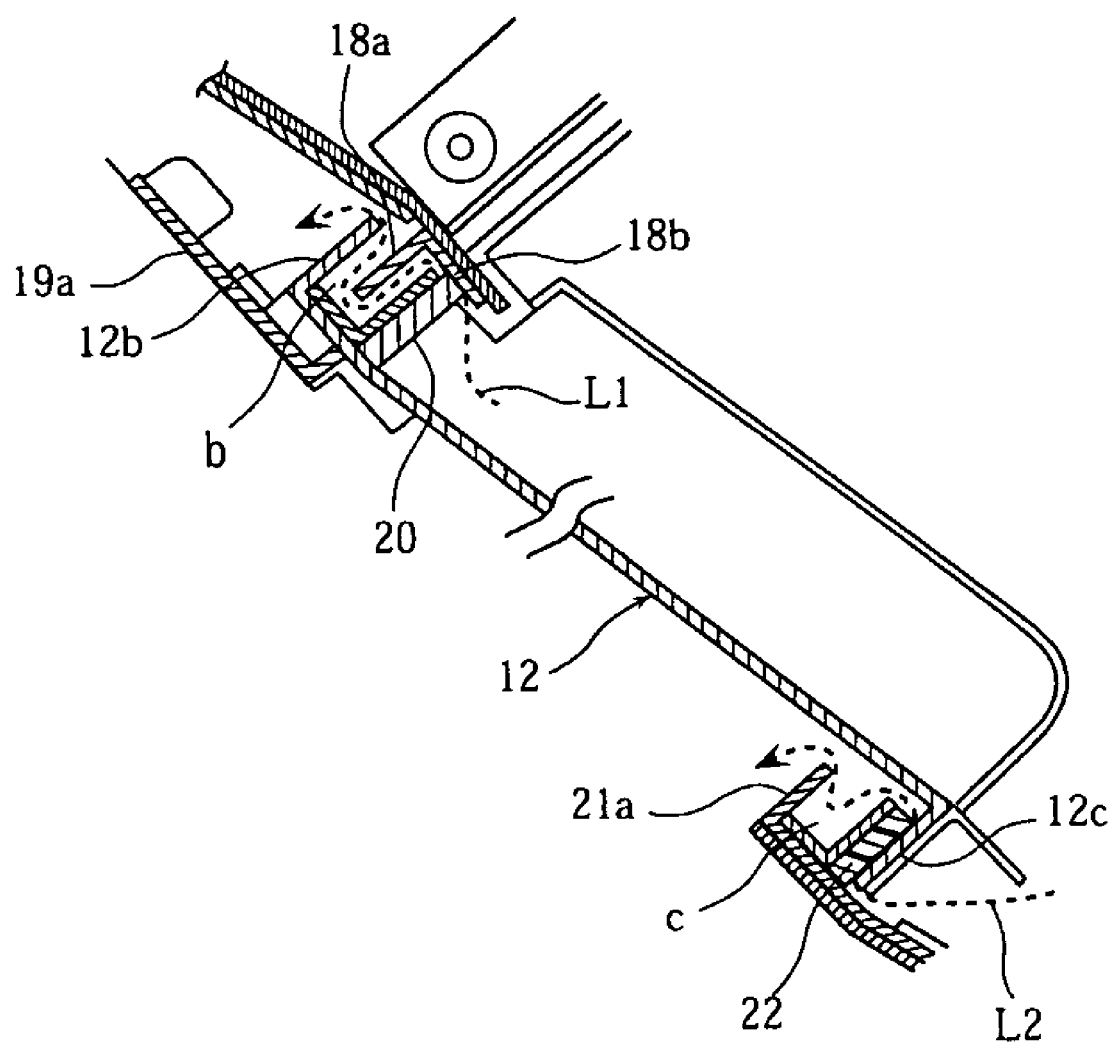
FIG. 9 is a view schematically showing a chip entrance path in first and second seal portions of the lathe.

As shown in FIG. 6, the first headstock 5 has a spindle 5a, a spindle head 5b rotatably supporting the spindle 5a, and a support frame portion 5c supporting the spindle head 5b, and a built-in motor is disposed in the spindle head 5b which rotationally drives the spindle 5a. To a front end portion of the spindle 5a, a chuck 5e is attached so that a nail 5f of the chuck 5e grasps the workpiece. Cutouts (openings) 5g are formed in inner portions at lower ends of leg portions 5d fixed on the bed 11 of the support frame 5c, and gaps a are formed between the cutouts 5g and the bed 11 which allow entrance of a later-described slide plate (cover member) 12.

The second headstock 6 has a spindle 6a, a spindle head 6b rotatably supporting the spindle 6a, and a support portion 6c supporting the spindle head 6b, and a built-in motor is similarly disposed in the spindle head 6b which rotationally drives the spindle 6a. Note that a numeral 6e denotes a chuck, and a numeral 6f denotes a nail.

A Z-axis feed mechanism 16 moving the second headstock 6 in the Z-axis direction has the following structure. A lower slide guide 13a and an upper slide guide 13b fixed to a leg portion 6d of the second headstock 6 are slidably fit to a lower linear guide rail 14a and an upper linear guide rail 14b, respectively. Both linear guide rails 14a and 14b are disposed parallel to the Z-axis, and the height of the lower linear guide rail 14a relative to the first slant surface 11a is set to be higher than the upper linear guide rail 14b.

Further, a ball screw 15 for Z-axis drive is disposed between the upper and lower linear guide rails 14b and 14a. A tip portion of the ball screw 15 is supported by a bearing 15a, and a nut member 15b is screwed to a middle portion of the ball screw 15. This nut member 15b is fixed to the leg portion 6d of the second tool post 6.

To a left end portion of the ball screw 15, a Z-axis drive motor 17 is connected, and the Z-axis drive motor 17 is fixed to a left end portion of the bed 11. The second headstock 6 moves in the Z-axis direction with rotational drive of the ball screw 15 by the Z-axis drive motor 17 of this Z axis feed mechanism 16.

The slide plate 12 is a cover member for preventing chips and so on from entering the Z-axis feed mechanism 16 side and is composed of a rectangular plate. At a base end portion of this slide plate 12, a fixed flange portion 12a is formed bent toward the upper side (the side of the spindle 6a of the second headstock 6), and the fixed flange portion 12a is fixedly bolted to the front surface of the leg portion 6d of the second headstock 6. Note that a portion of the leg portion 6d upper than the fixed flange portion 12a is covered by a cover plate 25. Further, a first seal portion 31 is formed on an upper side hem portion (a first side hem portion) along the longitudinal direction of the slide plate 12, and a second seal portion 32 is formed on a lower side hem portion (a second side hem portion).

The first seal portion 31 has the following detailed structure. At the upper side hem portion of the slide plate 12, an upper wall 12b is formed bent toward the upper side (the spindle 6a side). The upper wall 12b constitutes a weir portion of the present invention and constitutes, together with a longitudinal edge 18a of a later-described partition plate 18, a labyrinth structure which prevents chips and so on from entering the feed mechanism 16 side. Inside the upper wall 12b, a lateral edge of a groove plate 12d having a transverse section in an L-shape extending in the Z-axis direction is fixed, and a longitudinal edge 12d' of the groove plate 12d and the upper wall 12b form a groove b extending in the Z-axis direction and opening on the spindle 6a side.

In the groove b, the longitudinal edge 18a of the partition plate 18 having a cross section in an L-shape extending in the Z-axis is inserted. A lateral edge (a second slide contact member) 18b of the partition plate 18 is fixedly supported on a tip portion 19b of a support plate 19a. The support plate 19a is fixed to a support bracket (a bed side member) 19 fixed to the bed 11.

On a surface of the longitudinal edge 12d' of the groove plate 12d opposite to the groove b, a slide contact plate (a first slide contact member) 20 is fixed. This slide contact plate 20 is composed of a bearing metal with a low slide resistance, and employs a plate made of gun metal in this embodiment. A slide contact surface 20a located at the upper end of the slide contact plate 20 is in slide contact with the lower surface of the lateral edge 18b of the partition plate 18. This lateral edge 18b is pressed against the slide contact plate 20 by the elasticity possessed by the support plate 19a, so that the lateral edge 18b and the upper slide contact surface 20a of the slide contact plate 20 slide without a gap therebetween. Further, a support plate 19c is disposed below the upper wall portion 12b, and a flange portion 19e formed at the tip of the support plate 19c is in slide contact with the lower surface of the slide plate 12.

Thus, the first seal portion 31 is constituted having the slide contact plate 20 made of gun metal and the lateral edge 18b of the partition plate 18 sliding without a gap therebetwteen and having a labyrinth structure composed of the longitudinal edge 18a and the upper wall 12b which are disposed downstream from the slide portion of both members when viewed along a chip entrance path L1.

Beside, the second seal portion 32 has the following detailed structure. At the lower side hem portion of the slide plate 12, a lower wall 12c constituting the first slide contact member is formed bent toward the lower side (the ball screw 15 side). A cover plate 21 is disposed at the lower wall 12c. An upper wall 21a constituting a weir portion of the present invention is formed bent toward the upper side at an upper side hem portion of the cover plate 21, and a lower wall 21b is formed bent toward the lower side at a lower side hem portion.

At the upper wall 21a of the cover plate 21, a lateral edge portion of a groove plate 21c having a transverse section in an L shape extending in the Z-axis direction is fixed. A longitudinal edge portion 21c' of this groove plate 21c and the upper wall 21a form a groove c extending in the Z-axis direction and opening upward. On a surface of the groove plate 21c opposite to the groove c, a slide contact plate 22 is fixed which constitutes the second slide member of the present invention. This slide contact plate 22 is made of resin, and is in slide contact with the inner surface of the lower wall 12c of the slide plate 12.

Thus, the second seal portion 32 is constituted having the longitudinal edge 21c' of the groove plate 21c and the slide contact plate 22 made of rein sliding without a gap therebetwteen and having the groove c composed of the longitudinal edge 21c' and the upper wall 21a of the cover plate 21 which are disposed downstream from the slide portion of both members along a chip entrance path L2.

The direction of slide contact between the slide contact surface 20a of the slide contact plate 20 and the lateral edge 18b of the partition plate 18 in the first seal portion 31 is the same as that of the Y-axis, while the direction of slide contact between the lower wall 12c of the slide contact plate 22 and the lower wall 12c in the second seal portion 32 is the same as that of the X-axis. In other words, the slide contact directions of the first and second seal portions 31 and 32 are set to be perpendicular to each other. Note that the slide contact directions in the first and second seal portions 31 and 32 need not always to be perpendicular to each other but may be intersect with each other at a relatively large angle.

Further, in the first seal portion 31, the lateral edge 18b of the partition plate 18 is pressed against the slide contact surface 20a of the slide contact plate 20 by the elasticity possessed by the support plate 19a. Further, in the second seal portion 32, the cover plate 21 is constituted to be slightly movable in the X-axis direction such that the slide contact plate 22 presses the lower wall 12c.

Furthermore, the slide contact area between the slide contact plate 22 and the lower wall 12c in the second seal portion 32 is made larger than the slide contact area between the slide contact surface 20a of the slide contact plate 20 and the lateral edge 18b of the partition plate 18 in the first seal portion 31.

A seal plate 23 made of resin is in slide contact, in the Y-axis direction, with a portion of the lower surface of the cover plate 21 adjacent to the lower wall 21b. The seal plate 23 is fixed to a flange portion 24b formed bent at an upper end portion of a longitudinal wall portion 24a of a support bracket 24, and the support bracket 24 is fixed to the bed 11. The longitudinal wall portion 24a of the support bracket 24, the flange portion 24b and the lower wall 21b of the cover plate 21 form a groove d extending in the Z-axis direction and opening downward.

Since the first seal portion 31 and the second seal portion 32 are provided between the upper side hem portion and the lower side hem portion of the slide plate 12 and the partition plate 18 and the cover plate 21 which are disposed on the bed side in the first embodiment, even chips in a powder form and coolant can be prevented from entering the feed mechanism 16 side, thereby improving the sealing property.

More specifically, the first seal portion 31 is configured such that the elasticity of the support plate 19a is utilized to allow the slide contact plate 20 and the lateral edge 18b of the partition plate 18 to slide while being in contact with each other with a pressing force, and the second seal portion 32 is configured such that the cover plate 21 is slightly movable in the X-axis direction to allow the slide contact plate 22 and the lower wall 12c to slide while being in contact with each other with a pressing force, thereby preventing creation of a gap between slide contact surfaces of the slide contact plate and the bed side member with the slide.

Further, the direction of slide contact between the slide contact plate 20 and the lateral edge 18b in the first seal portion 31 which is provided on one end of the slide plate 12 disposed in an inclined state is made the same as that of the Y-axis, and the direction of slide contact between the slide contact plate 22 and the lower wall 12c in the second seal portion 32 provided on the other end is made the same as that of the X-axis, whereby the sealing property can be further improved.

More specifically, in the case where the slide contact directions in the two seal portions are the same, when the sealing property of one of them is increased, the sealing property of the other may be lowered. In the present invention, a structure such that the slide contact plate 22 fixed to the cover plate 21 presses the lower wall 12c in the X-axis direction is employed in order to increase the sealing property of the second seal portion 32, and this pressing structure never adversely affects the sealing property of the first seal portion 31.

The second seal portion 32 disposed on the lower side is configured such that the lower wall 12c of the slide plate 12 bent downward and the slide contact plate 22 is brought into slide contact with the inner surface of the lower wall 12c, and the groove plate 21c and the upper wall 21a of the cover plate 21 are located inside the slide contact plate 22, so that chips smoothly flow down along the slide plate 12 and thus never accumulate near the lower hem of the slide plate 12.

Furthermore, the slide contact area in the second seal portion 32 provided on the lower side of the slide plate 12 which is disposed in an inclined state is made larger than the slide contact area in the first seal portion 31 provided on the higher side, so that the sealing property can be further improved.

More specifically, when the slide plate 12 is disposed in an inclined state, many chips will flow to the lower side. In this embodiment, the slide contact area in the second seal portion 32 on the lower side is large, thus enabling sure sealing even when many chips flow down.

Further the cutouts (openings) 5g are provided which permit a portion 12e of the slide plate 12 on the first headstock 5 side to enter the space between the first headstock 5 and the bed 11 with the second headstock 6 approaching the first headstock 5, thereby making it possible to prevent chips and so on from entering the feed mechanism 16 side via the first headstock 5 side.

The upper wall 12b and the upper wall 21a which function as weir portions to inhibit chips from entering the feed mechanism 16 side are formed downstream from slide contact surfaces of the slide contact plate 20 or 22 and the lateral edge 18b or the lower wall 12c along the entrance paths L1 and L2 of chips toward the feed mechanism 16 side, so that even if the chips and so on pass through the gap between the slide contact surfaces, the weir portions can prevent the chips and so on from entering the feed mechanism 16 side, thereby further improving the sealing property.

Note that though a case where the slide contact plate on the higher side is made of gun metal and the slide contact plate on the lower side is made of resin is shown in the above embodiment, both of the slide contact plates on the higher side and the lower side can be made of gun metal or made of rein, or the slide plate on the higher side can be made of resin and the slide plate on the lower side can be made of gun metal in the present invention, and further, the slide contact plate of the present invention is not limited to a specific material, but any material can be employed as long as it has a low slide resistance which is suitable as a slide contact member.

Though a case in which the slide contact directions in the first and second seal portions intersect with each other has been described in the above embodiment, both the slide contact directions can be made parallel to each other in the present invention. In this case, both the seal portions can be made to have the same structure to thereby avoid complexity of the structure.

Furthermore, a case of a lathe having a slant-type bed has been described in the above embodiment, but the scope of application of the present invention is not limited to the slant-type lathe, and the present invention is applicable to any machine tool as long as it has a configuration to cover its feed mechanism by a cover member fixedly disposed on a movable stage.

What is claimed is:

1. A machine tool comprising a bed, a headstock fixed on said bed, a spindle rotatably supported on said headstock, a movable unit mounted on said bed to be movable in a direction parallel to a rotation axis of said spindle, and a feed mechanism mounted on said bed for moving said movable unit in the parallel direction, wherein a cover member is provided to cover the feed mechanism, the cover member being fixed to the movable unit to move in the parallel direction together with the movable unit, a side hem portion parallel to the moving direction of the cover member is arranged close to a bed side member, and a first seal portion provided between the side hem portion and the bed side member, the first seal portion having a groove portion and having a first slide contact member which is provided on any one of the cover member side and the bed side member to extend in the moving direction, the first slide contact member comprising a wall of the groove portion and a second slide contact member which is provided on another of the cover member side and the bed side member, to extend in the moving direction and having a longitudinal edge inserted into the groove portion and a lateral edge whose lower surface is in slide contact with an upper slide contact surface of the first slide contact member and the first slide contact member and lateral edge of the second slide contact member relatively sliding while being in contact with each other.

2. The machine tool according to claim 1,
wherein a first seal portion and a second seal portion are provided on a first side hem portion and a second side hem portion which are parallel to the moving direction of the cover member, respectively, the cover member is disposed in an inclined state such that the first side hem portion is located at a position higher than that of the second side hem portion, and a planar direction of slide contact between the first and second slide contact members in the first seal portion intersects with a planar direction of slide contact between the first and second slide contact members in the second seal portion.

3. The machine tool according to claim 1,
wherein a first seal portion and a second seal portion are provided on a first side hem portion and a second side hem portion which are parallel to the moving direction of the cover member, respectively, the cover member is disposed in an inclined state such that the first side hem portion is located at a position higher than that of the second side hem portion, and a direction of slide contact between the first and second slide contact members in the first seal portion is parallel to a direction of slide contact between the first and second slide contact members in the second seal portion.

4. The machine tool according to claim 1,
wherein a first seal portion and a second seal portion are provided on a first side hem portion and a second side hem portion which are parallel to the moving direction of the cover member, respectively, the cover member is disposed in an inclined state such that the first side hem portion is located at a position higher than that of the second side hem portion, and a slide contact area between the first and second slide contact members in the first seal portion is larger than a slide contact area between the first and second slide contact members in the second seal portion.

5. The machine tool according to claim 1,
wherein an opening is formed between a leg portion of the headstock and the bed for allowing a portion of the cover member on the headstock side to enter a space between the headstock and the bed with the movable unit approaching the headstock.

6. The machine tool according to claim 1,
wherein a weir portion preventing entry of a chip to the feed mechanism side is formed downward from the slide contact member along an entrance path of the chip to the feed mechanism side.

* * * * *